(12) United States Patent
Dancila

(10) Patent No.: US 8,342,442 B1
(45) Date of Patent: Jan. 1, 2013

(54) ADVANCED AIRSHIP TECHNOLOGIES

(75) Inventor: Dragos-Stefan Dancila, Marietta, GA (US)

(73) Assignee: Dancila LLC, Marietta, GA (US)

( * ) Notice: Subject to any disclaimer, the term of this patent is extended or adjusted under 35 U.S.C. 154(b) by 695 days.

(21) Appl. No.: 12/152,626

(22) Filed: May 15, 2008

Related U.S. Application Data

(60) Provisional application No. 60/938,118, filed on May 15, 2007, provisional application No. 60/938,186, filed on May 16, 2007.

(51) Int. Cl.
*B64B 1/00* (2006.01)
(52) U.S. Cl. ............... 244/30; 244/24; 244/25; 244/26; 244/198; 244/128
(58) Field of Classification Search .............. 244/24, 244/25, 26, 30, 198, 128
See application file for complete search history.

(56) References Cited

U.S. PATENT DOCUMENTS

| 1,717,552 | A | * | 6/1929 | Dunn | 244/25 |
|---|---|---|---|---|---|
| 2,384,893 | A | * | 9/1945 | Crook | 244/73 R |
| 3,346,216 | A | * | 10/1967 | Desmarteau | 244/30 |
| 3,420,473 | A | * | 1/1969 | Krafft | 244/30 |
| 3,976,265 | A | * | 8/1976 | Doolittle | 244/2 |
| 4,350,898 | A | * | 9/1982 | Benoit | 290/55 |
| 4,350,899 | A | * | 9/1982 | Benoit | 290/55 |
| 4,967,983 | A | * | 11/1990 | Motts | 244/30 |
| 5,071,090 | A | * | 12/1991 | Takahashi et al. | 244/29 |
| 5,071,383 | A | * | 12/1991 | Kinoshita | 446/37 |
| 5,152,478 | A | * | 10/1992 | Cycon et al. | 244/12.2 |
| 5,645,248 | A | * | 7/1997 | Campbell | 244/30 |
| 6,588,702 | B2 | * | 7/2003 | Robbins | 244/31 |
| 6,766,982 | B2 | * | 7/2004 | Drucker | 244/96 |

OTHER PUBLICATIONS

The Effect of Base Bleed on the Flow behind a Two-Dimensional Model with a Blunt Trailing Edge, P.W. Bearman, "The Aeronautical Quarterly," vol. XVIII, Aug. 1967., pp. 207-225.
Aerostation, ISSN 0741-5974, vol. 28, No. 3, Fall, 2005, pp. 1-7.
Widerstandsverminderung Durch Ventilation, Meier et al., "DGLR Bericht", 1990, vol. 90, No. 6, 1990, pp. 311-315.
Nuove Prospettive per l'aeronave, Nicola Bonora, © Rubbettino, 2005, pp. 1-132.
Bluff-body drag reduction by passive ventilation, Suryanarayana et al., "Experiments in Fluids," © Springer-Verlag 1993, pp. 73-81.

(Continued)

*Primary Examiner* — Isam Alsomiri
*Assistant Examiner* — Justin Benedik
(74) *Attorney, Agent, or Firm* — Womble Carlyle Sandridge & Rice, LLP

(57) ABSTRACT

An airship is disclosed in the form of a spherical hull having a venting duct extending diagonally therethrough from an entrance end at the forward facing surface of the hull to an exit end at the rearward facing surface of the hull. A propeller is disposed in the duct to direct an air flow through the duct for expulsion at the exit end and the exiting flow is vectored by a set of controllable louvers at the exit end. The expulsed airflow reduces drag normally associated with a spherical airship by disturbing the wake at the trailing surface of the airship. A mooring method and apparatus also is disclosed for minimizing wind induced loads on the airship, or indeed on any body such as a gas storage tank, by supporting the airship or other body a predetermined distance above the ground.

16 Claims, 12 Drawing Sheets

OTHER PUBLICATIONS

Effect of natural ventilation on the boundary layer separation and near-wake vortex shedding characteristics of a sphere, Suryanarayan, "Experiments in Fluds," © Springer-Verlag 2000, pp. 582-591.

Wake Flow Stabilization by the Action of a Base Bleed, H.Y. Wong, "Transactions of the ASME," vol. 107, Sep. 1987, pp. 378-384.

Technical Notes—The Effect of Base Bleed on a Periodic Wake, C.J. Wood, "Journal of the Royal Aeronautical Society," Jul. 1964, vol. 68, pp. 477-482.

* cited by examiner

Boat tail streamlining effect of the duct flow – stationary counter-rotating vortex structures that steady the wake flow thereby reducing drag.

Pressure distributions on a vented spherical hull.

Modified vented sphere configuration with intake bell-mouth fairing.

Flow field modification for the case of a vented sphere with a propeller in the duct.

Wall Distance, % of D

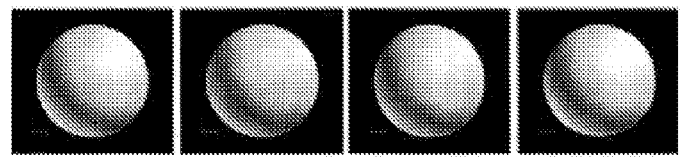
*Fig. 13a - Frontal View*
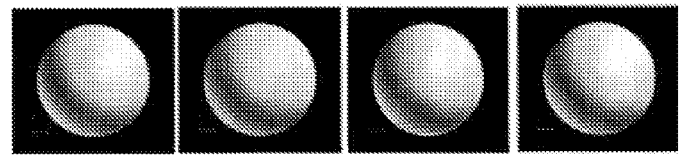
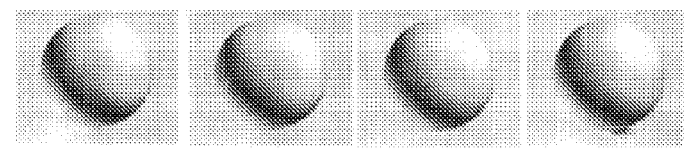
*Fig. 13b - Isometric Front View*
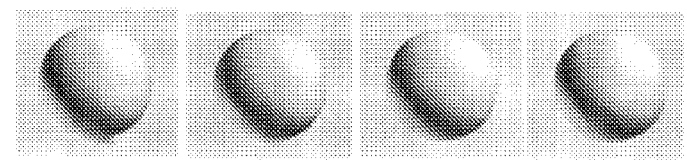
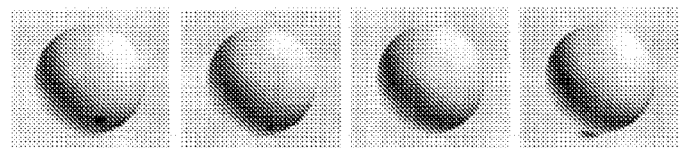
*Fig. 13c - Isometric Rear View*
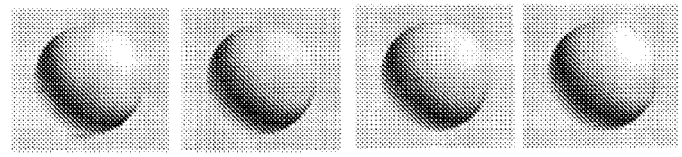
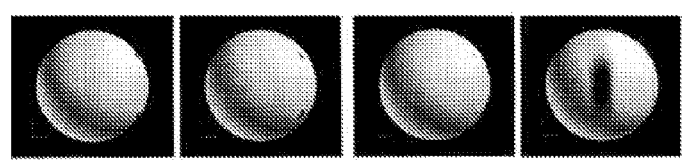
*Fig. 13d - Bottom View*
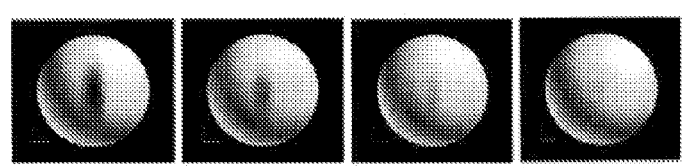

Airship and pedestal mooring prototype.

Airship and pedestal mooring prototype.

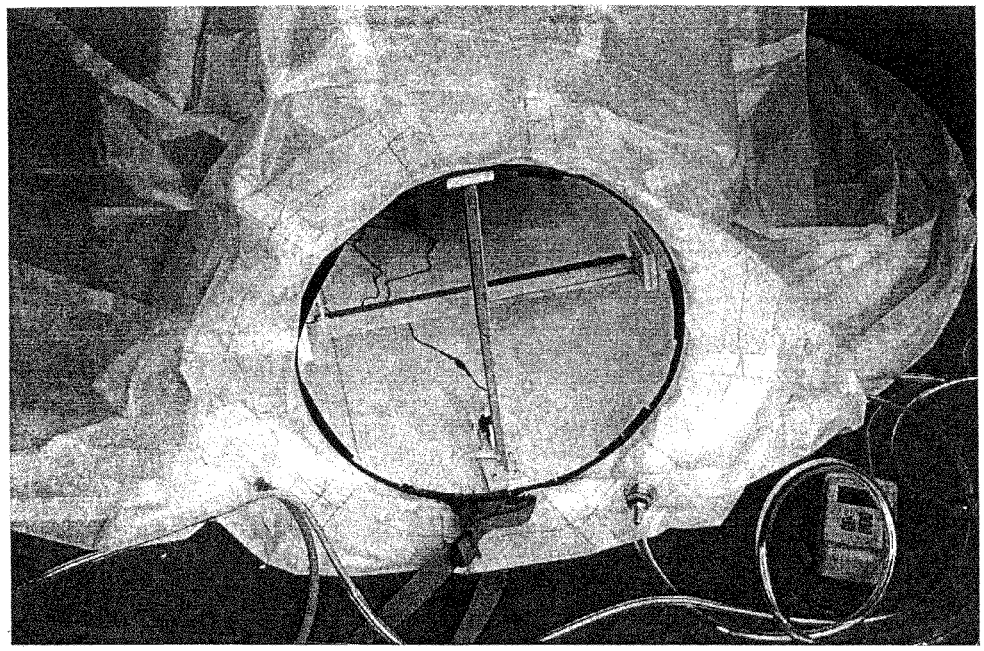
*Fig. 19*   Airship control surfaces.
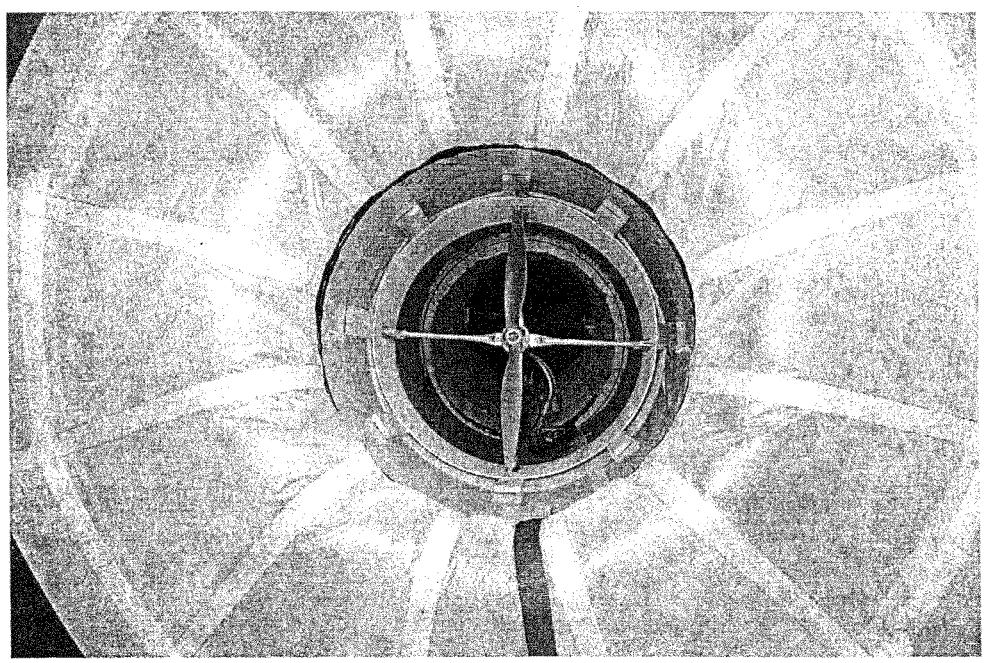
*Fig. 20.*   Airship propulsor.

ADVANCED AIRSHIP TECHNOLOGIES

REFERENCE TO RELATED APPLICATIONS

The benefit of the filing dates of U.S. provisional patent application Ser. Nos. 60/938,118 filed May 15, 2007 and 60/938,186 filed May 16, 2007 is hereby claimed.

TECHNICAL FIELD

This invention generally relates to airships and their operation. More specifically, the invention relates to drag reduction on airship hulls using a ducted hull configuration that optionally includes propulsion means forcing airflow through the duct. Airship control means may be associated with the duct flow. This invention also more specifically relates to an apparatus and method for mooring an airship hull in such a way as to reduce wind-induced airloads.

BACKGROUND

Bluff Body Drag Reduction Via Venting

Bluff bodies, such as spheres, are generally characterized by high drag coefficients when exposed to an airflow. The high drag coefficients are caused by early separation of a boundary layer, resulting in a large unsteady wake that is dominated by large eddies and low average pressure. Research has shown that the unsteadiness of the wake is responsible for large amounts of kinetic energy being continually shed in the wake (von Karman[1], Roshko[2]), which causes high drag.

Blowing of the wake region has been shown to be effective in reducing drag coefficient ($C_d$) on 2D and 3D bodies (Bearman[3], Wood[4], etc.) Normal blowing in the wake region is referred to as base bleed and has been shown effective in reducing the values of drag coefficient for bluff bodies. However, the external provision of fluid for base bleed is energetically expensive and it increases the level of complexity of the solution.

A simpler counterpart to powered base bleed is the passive concept of wake blowing via vented bodies. A duct connects the leading edge to the trailing edge regions, allowing the natural pressure difference to induce a flow in the duct. This duct flow has been shown to influence the wake and reduce drag.

Vented 2D bodies have been proposed and investigated in the past, and results of such investigations are published in the literature.

A vented sphere concept (FIG. 1) has been proposed and investigated by Meier, Suryanarayana, and Pauer[5] in 1990. The concept has been further investigated by Suryanarayana, Pauer, and Meier[6] in 1993, and by Suryanarayana and Prabhu[7] in 2000. For the configurations investigated the duct diameter was equal to 15% of the diameter of the sphere, resulting in a duct cross sectional area of only 2.25% of the projected area of the sphere. Their published results showed up to 60% reduction in $C_d$ in the supercritical Re number regime.

Recent Computational Fluid Dynamics (CFD) investigations by the inventor provided results that correlate well with the experimental results discussed in the previous paragraph. They confirm the flow characteristics observed and reported in the experimental investigation, and suggest that the major mechanism for drag reduction is based upon the steadying effect that the duct flow has over the wake flow. A pair of stationary, counter-rotating vortex rings form on the leeward side and provide a boat-tailing effect for the flow (FIG. 2).

Bluff Body Airloads Near a Wall

Fluid flow over a body can be significantly influenced by the proximity of a wall or other surface, resulting in aerodynamic coefficients that can be significantly different from those in free flight.

As an example, Computational Fluid Dynamics (CFD) calculations at Reynolds (Re) numbers on the order of $10^6$ show that in free flight the drag coefficient of a sphere (a type of bluff body of interest for numerous practical applications) is $C_d$=0.2 and the lift coefficient is $C_l$=0. At the same Re number for a sphere tangent to a ground plane (FIG. 3) CFD calculations show that the drag and lift coefficients become $C_d$=0.76 and $C_l$=0.56, respectively. The increased aerodynamic coefficients are responsible for corresponding increases in airloads.

In the case of a body that is moored to the ground such an increase in airloads requires corresponding increases in mooring loads, which is undesirable. In the case of a sphere tangent to a ground plane, the resulting drag is increased and a positive lift that tends to move the sphere away from the ground plane also occurs (FIG. 4).

From a physical perspective, the increased airloads are caused by the flow blockage in the region where the sphere is tangent to the ground plane (FIG. 3), resulting in a pressure distribution as shown in FIG. 4.

Airship Hull Shapes

Airships generate static lift through buoyancy, which is proportional with the volume occupied by the lifting gas contained in the hull of the airship. The static lift is equal to the buoyancy force minus the weight of the airship, a significant component of which is given by the weight of the envelope. This in turn is proportional to the surface area of the envelope.

It follows that in order to maximize the lift produced by a given volume of lifting gas, the surface area of the envelope should be minimized. It is well known that a sphere minimizes the surface area for a given volume. Therefore it would seem that low aspect ratio, and in the limit spherical envelope airships, should be desirable. However, a simple inspection of classical airship shapes shows this not to be the case for at least the reasons that (1) Low aspect ratio, and in the limit spherical hulls are bluff bodies characterized by high drag; and (2) Low aspect ratio hulls are aerodynamically unstable, having a tendency to broadside.

Conventional airship hulls have elongated shapes, typically with an aspect ratio (length divided by maximum transverse diameter) higher than 3. However, while characterized by lower drag and lower level of aerodynamic instability they are nevertheless affected by deficiencies of their own, which include the following:

Weight penalty associated with much larger envelope area;
  Additional weight penalty due to increased envelope material strength requirements due to increased structural loads on the elongated airship hull;
  Limited turn performance, resulting in large airship turn radii;
  Large required ground footprint for mooring in order to allow an airship moored by the nose of the hull to freely weathervane with the wind;
  Lifting gas sloshing instability at low fill factors, which can cause the airship hull to uncontrollably reach a fully nose up or fully tail up attitude.

A class of toroidal shape hull airships has been proposed. In 1986 Todd has proposed the Toroidal Balloon Concept shown in FIG. 5. In 1991 Tachibana et al. have proposed the Toroidal Semi-Buoyant Station shown in FIG. 6. Both of these concepts represent airship configurations for which the buoyancy of the lifting gas is simply used to supplement the lift from a main rotor. This essentially is a helicopter-balloon hybrid. The axis of the hull duct is oriented vertically and the configuration is not proposed or intended for hull drag reduction in forward flight.

Technologies that are capable of significant hull drag reduction and/or of alleviating the aerodynamic hull instabilities have the potential to enable the development of low hull aspect ratio airships and are desirable.

Airship Mooring

Conventional airships are typically moored to a ground mast by the nose of the hull and are allowed to weathervane around the mast with the wind. Consequently, the required obstacle clear mooring area is a circle of very large radius, larger than the length of the airship hull. This represents a significant problem, in particular for airships that need to be operated from unimproved, tactically selected locations.

For spherical and other unconventional airships, a mooring method that positions and restrains the airship tangent to the ground has been used. However, as discussed above, this mooring method results in very high wind airloads which can lead to structural failures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 13a depicts a frontal view showing pressure distribution over a sphere for separation distances of 0% (sphere moored on the ground), 0.8%, 1.6%, 2.5%, 5%, 7.5%, 10%, and 12%, respectively.

FIG. 13b depicts an isometric front view showing pressure distribution over a sphere for separation distances of 0% (sphere moored on the ground), 0.8%, 1.6%, 2.5%, 5%, 7.5%, 10%, and 12%, respectively.

FIG. 13c depicts an isometric rear view showing pressure distribution over a sphere for separation distances of 0% (sphere moored on the ground), 0.8%, 1.6%, 2.5%, 5%, 7.5%, 10%, and 12%, respectively.

FIG. 13d depicts a bottom view showing pressure distribution over a sphere for separation distances of 0% (sphere moored on the ground), 0.8%, 1.6%, 2.5%, 5%, 7.5%, 10%, and 12%, respectively.

FIG. 19 illustrates control surfaces of the prototype airship of FIGS. 17 and 18.

FIG. 20 is a front view through the duct of the prototype airship of FIGS. 17 and 18 illustrating the propulsor located therein.

DESCRIPTION OF THE INVENTION

Toroidal Hull Airships for Drag Reduction

Figure 1:
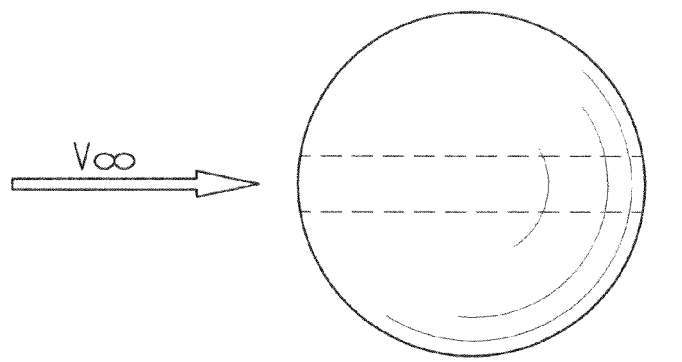
FIG. 1 is a side view of a vented sphere airship incorporating principles of the present invention.
Figure 3:
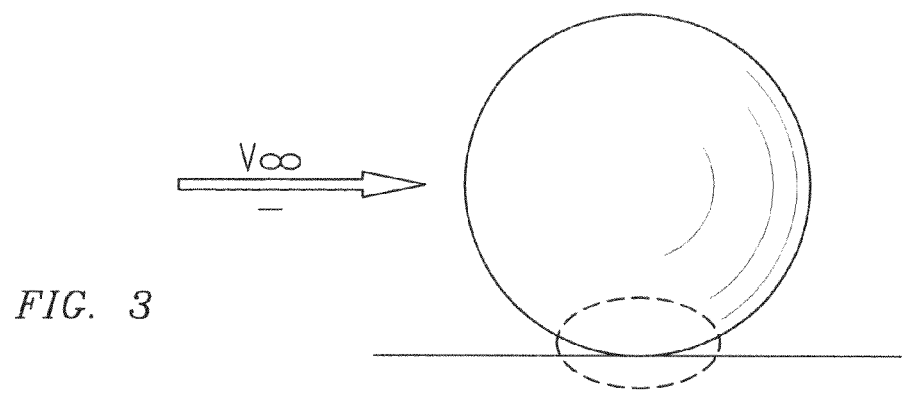
FIG. 3 illustrates flow over a sphere on tangent to a ground plane.
Figure 4:
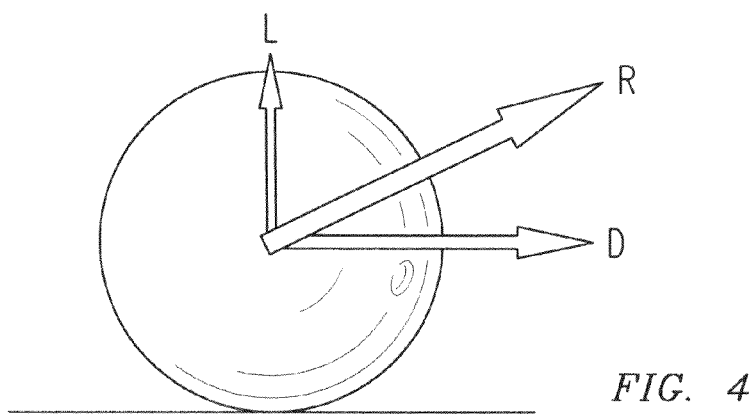
FIG. 4 illustrates lift, drag, and overall aerodynamic resultant on a sphere tangent to a ground plane.
Figure 2:
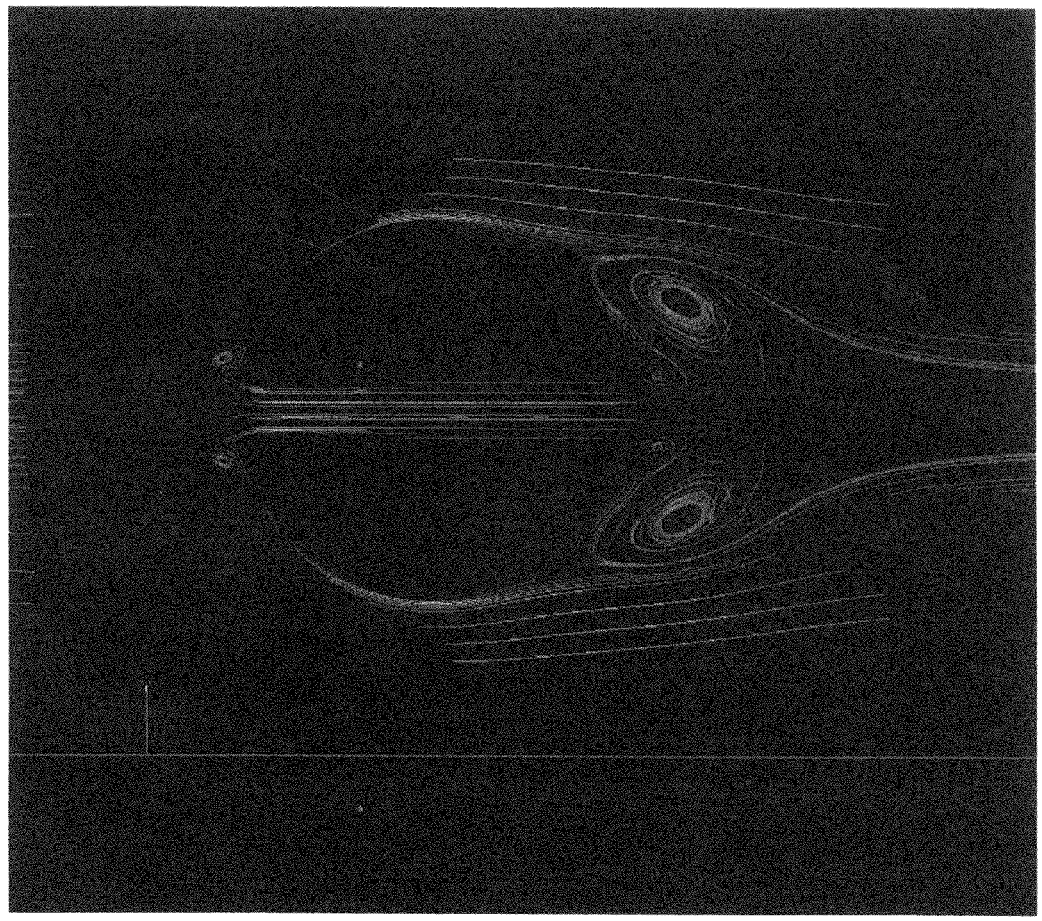
FIG. 2 is a flow field illustrating a boat tail streamlining effect of the duct flow for a vented sphere such as that illustrated in FIG. 1.
Figure 5:
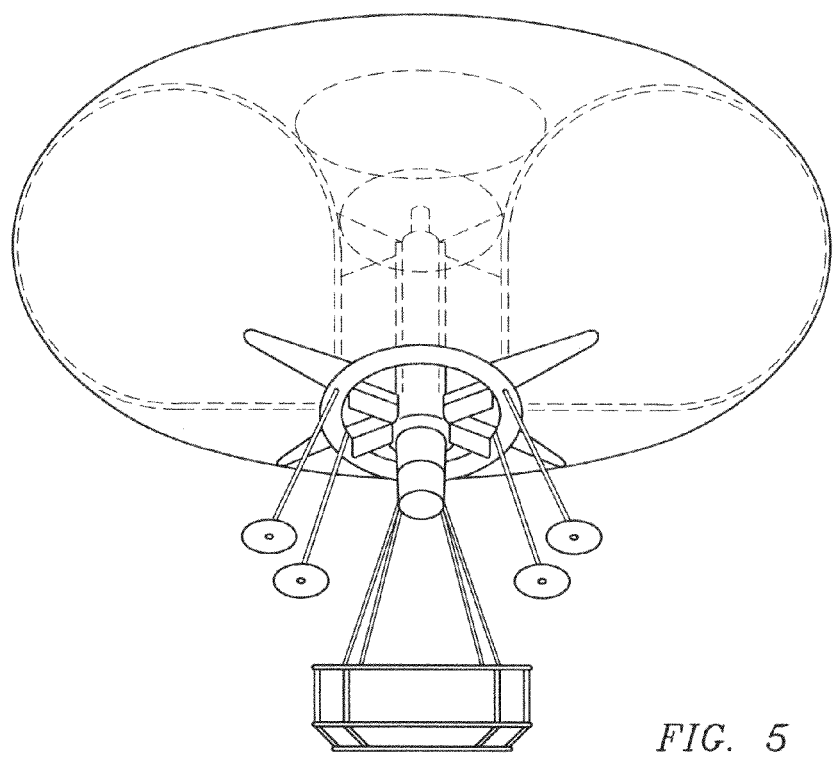
FIG. 5 illustrates a prior art toroidal balloon concept.
Figure 6:
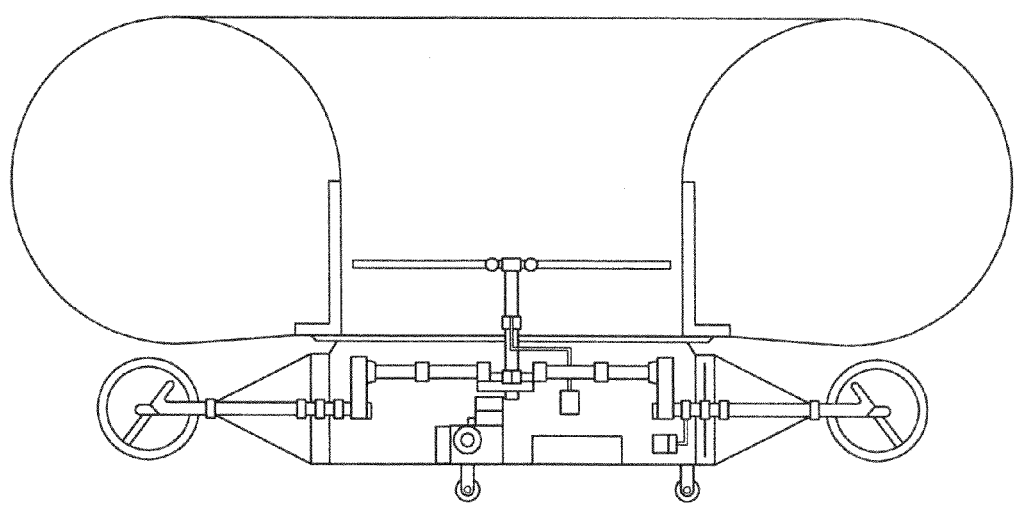
FIG. 6 illustrates a prior art toroidal semi-buoyant station.
Figure 7:
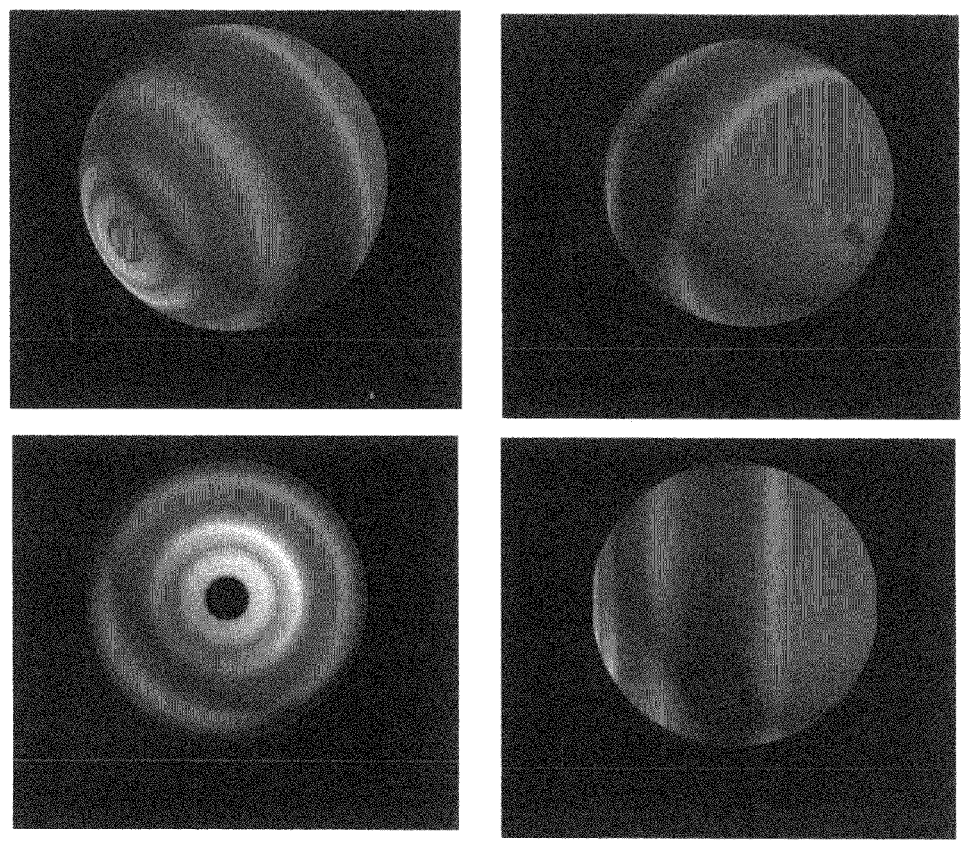
FIG. 7 illustrates pressure distributions on a vented spherical hull constructed according to the present disclosure.

The present invention advances the state of the art in airship design by reducing drag coefficients for bluff airship hulls (e.g. spherical and/or low aspect ratio bodies) through the use of a vented hull configuration. FIG. 7 shows the CFD calculated pressure distributions on a vented spherical hull constructed according to the invention.

The airship vented hull concept according to the present invention allows the use of a more structurally efficient hull shape while alleviating the airship performance penalty traditionally associated with such hull shapes, thereby providing significant overall performance improvements for the resulting airship.

Figure 8:
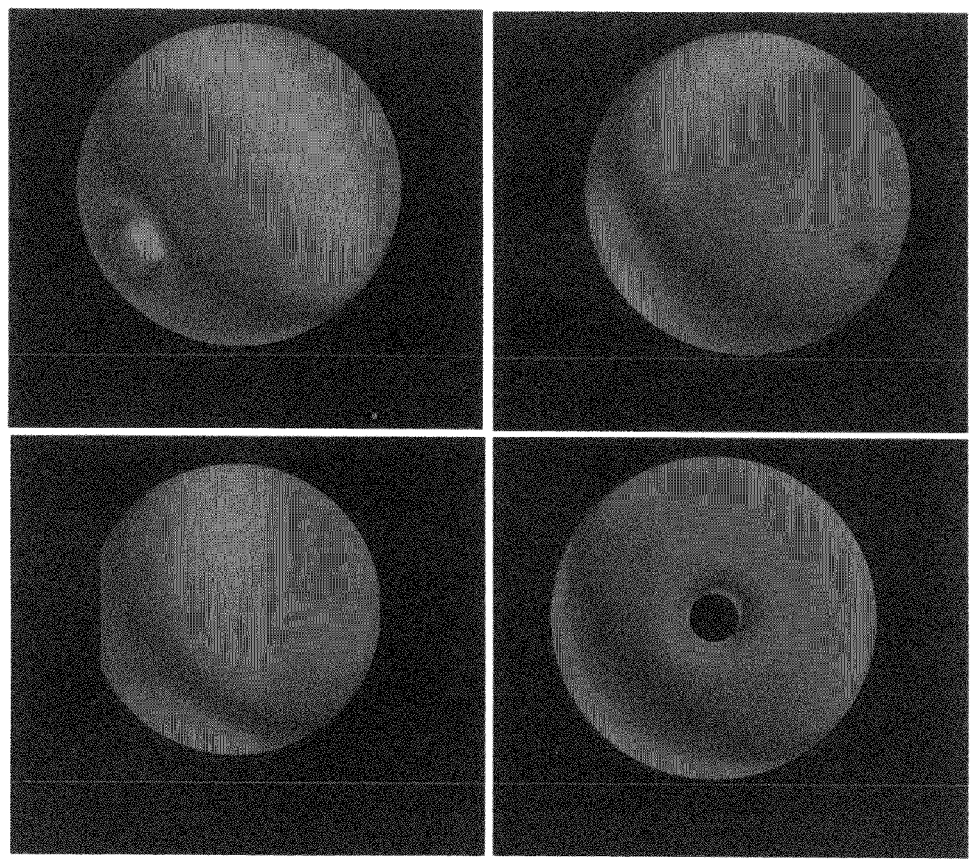
FIG. 8 illustrates a modified vented sphere configuration with intake bell-mouth fairing.

The concept can be further refined by providing modifications of the duct shape in order to maximize drag reduction or reach other optimization goals, as needed. FIG. 8 shows a modification of the duct intake with a bell-mouth flared out fairing.

In order to keep the duct from collapsing and for supporting propulsive and structural loads an appropriate duct structure is necessary, which can be implemented in any of a number of technologies such as sandwich shell, isogrid, inflatable structure, etc., and manufactured from any combination of materials (metals, composites, etc.).

The duct preferably is supported from the envelope through a set of catenary lines that distribute the loads over a larger area of the envelope.

Figure 9:
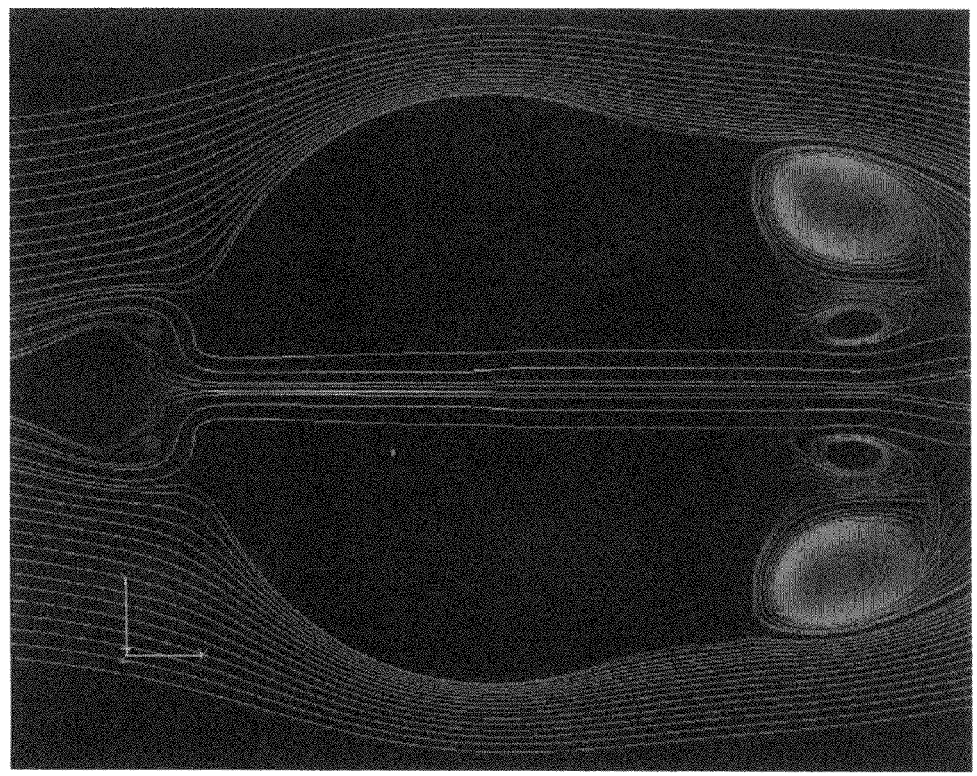
FIG. 9 is a flow field illustrating modification for the case of a vented sphere with a propeller in the duct.

A ducted propeller is known to operate more efficiently than the counterpart free propeller. Therefore, a further improvement of the concept can be obtained by the provision of a propulsive system in the duct, thereby further increasing the duct flow and further reducing hull drag. FIG. 9 shows the CFD computed flowfield for a vented sphere with propeller-based propulsion in the duct. It should be understood that any other propulsion system can be substituted for the propeller (e.g. a turboprop, a jet engine, or even a rocket engine).

A further improvement according to the invention consists in an airship configuration that is formed by a vented, ducted hull with the entire propulsion system mounted inside the duct. The increased flow in the duct will reduce drag by further amplifying the flow in the stationary vortex rings on the leeward side of the hull, thereby providing an equivalent aerodynamic streamlining effect for the hull.

The shape of the duct is not restricted to a cylinder. In fact, a non-cylindrical duct shape may be advisable in order to maximize the propulsive efficiency and allowing additional thrust to be generated.

Furthermore, a deflection of the duct exit flow using any of a number of methods (e.g. a vectorable nozzle, or control surfaces such as a set of deflecting louvers at the exit end of the duct) provides the means for generating yaw and/or pitch control moments and forces, thereby eliminating the need for external control surfaces and/or vectored propulsive forces to obtain the same effect.

The control surfaces at the end of the duct can provide pitch and yaw airship control moments. Further, where a propeller or other rotating propulsor is used in the duct, the use of a control surface deflection splitting technique can be used to counteract the torque of the propeller and counteracting airship roll moments can be generated. For example, one or more louvers may be split with the resulting portions oriented oppositely so that thrust air passing over them is given a slight twist as it exits to counteract the torque imparted to the airship by the rotating propeller.

Figure 10:
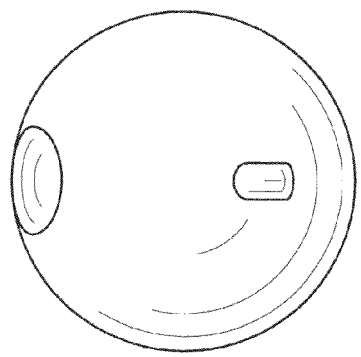
FIG. 10 is a perspective view of a vented spherical airship according to the disclosure with propulsion in the duct and vectorable nozzles.

Yet another further improvement according to the invention can be obtained by providing venting duct branches that open to the sides of the hull, and have means for duct flow deflection over a 360 degree azimuth angle. This can be accomplished, for example, with actuated elbow nozzles disposed on the sides of the hull and coupled to the central venting duct through lateral duct paths. The flow in the venting duct can then be divided with appropriate valving mechanisms (e.g. a butterfly valve) between the straight venting duct path and the lateral duct paths, as needed. The lateral duct flows can then be vectored to generate yaw moments, roll moments, and up/down/forward/backward control forces. An airship hull with such a configuration is shown in FIG. 10.

A control system, which may include, for instance, gyros, can be incorporated to eliminate airship instabilities.

The present invention thus includes a novel configuration of airships with low hull aspect ratio and low envelope structural mass for a given volume, using a venting duct that results in drag reductions on the order of 60%. The present invention also includes a vented airship configuration for which the propulsion system is partially or preferably fully located in the duct for a more efficient propulsion, a more streamlined airship hull, and reduced weight penalty compared to the case of propulsors mounted on the envelope and/or on a attached car. The present invention also includes a vented airship configuration with a propulsion in the duct and a set of duct branches that open at certain locations on the airship hull, and at which locations the duct flow can be deflected or vectored as needed in order for the combination of effects to generate control forces and moments needed for the normal operation of the airship, thereby completely eliminating the need for any classical airship external control surfaces and/or vectored thrust controls. The result is an airship configuration as shown in FIG. 10.

Airship Pedestal Mooring

The invention described in this document further includes an apparatus and method for the management of loads on a body due to fluid flow in the presence of a wall or other boundary surface such as the ground. Without restricting the scope of the above definition, one particular system of practical interest that exemplifies this aspect of the present invention is that of an airship moored to the ground and subject to the action of winds.

Figure 11:
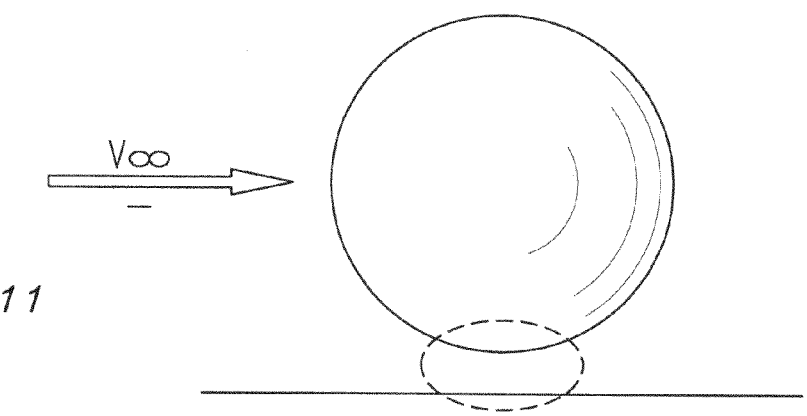
FIG. 11 illustrates flow over a sphere elevated above a ground plane.

A solution that alleviates or at least greatly reduces problems associated with the increase in airloads in such a mooring scenario is embodied by the apparatus and method of this invention. It is based upon the concept of providing a separation distance between the body (e.g. an airship) and the wall (e.g. the ground), which will allow part of the air flow to travel through the constricted passage between the body and the wall creating suction, and at the same time entraining downstream the near wake and flow structures behind the body (See FIG. 11). All aerodynamic coefficients will be modified as a function of the separation distance, and an optimal distance can be selected based upon specific objectives.

Figure 12:
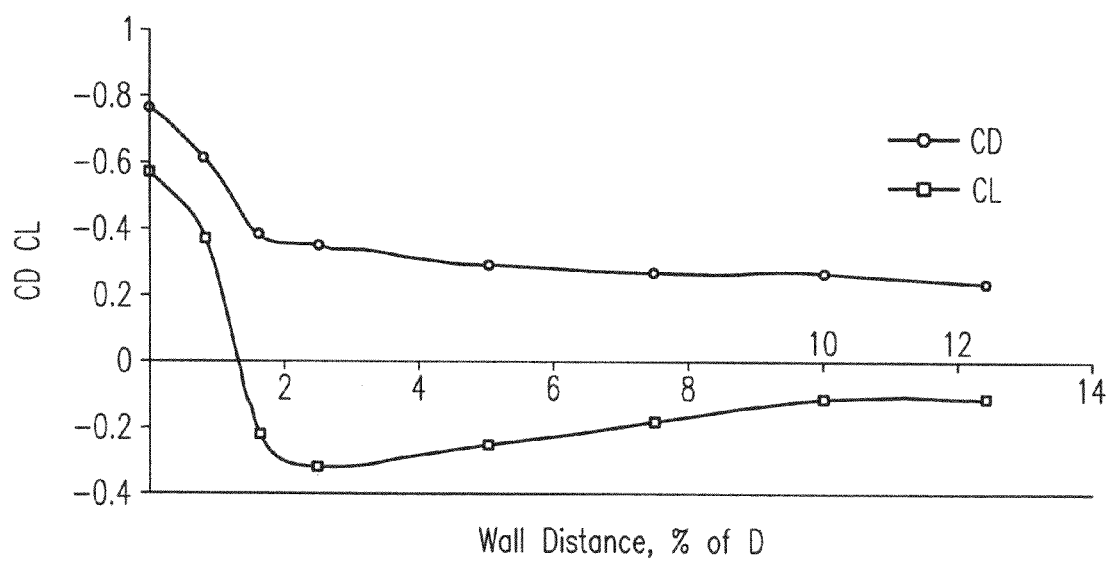
FIG. 12 is a graph of drag and lift coefficient variation for flow of a sphere as a function of separation distance from a wall.

FIG. 12 shows the variation of lift and drag coefficients over a sphere as a function of the distance to a wall. It can be seen that as the separation distance is increased, the drag coefficient is monotonically decreased. At the same time, the lift coefficient is reduced, switches sign, reaches a lowest value and subsequently returns towards zero.

FIGS. 13*a*-13*d* show left-to-right and top-to-bottom the pressure distributions over a sphere near a ground plane for distances of 0% (sphere moored on the ground), 0.8%, 1.6%, 2.5%, 5%, 7.5%, 10%, and 12.5%, respectively of the diameter of the sphere. The blue or darkened areas represent zones of intense suction, while the orange-yellow or lighter areas represent zones of high pressure.

The results depicted in FIGS. 12 and 13*a*-13*d* clearly show that for a sphere the distance to the wall is a very important parameter influencing the aerodynamic loads experienced, and it can be used to manage within certain limits the magnitude and direction of the airloads. For a non-spherical body, orientation is an additional parameter set that can be used in conjunction with separation distance for the same purpose.

Figure 14:
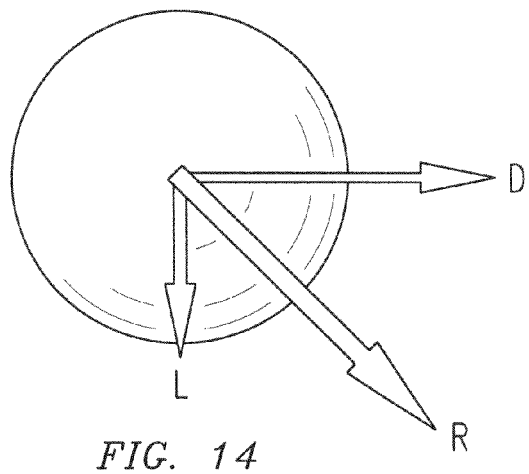
FIG. 14 illustrates lift and drag for a distance separation of 5% of the diameter of a sphere.

FIG. 14 shows that for a wall (ground) separation distance of 5% of the diameter of the sphere, the direction of lift can be reversed (negative lift, pushing the sphere towards the wall), while the drag can be reduced compared to the baseline case of a sphere tangent to the ground plane.

An apparatus that positions the body at the desired distance and/or orientation from a wall such as the ground while allowing the flow in between the wall and the body with minimal restriction is embodied by the present invention in a apparatus or tool in the form of a support pedestal to implement the method of fluid dynamic loads management taught.

Figure 15A:
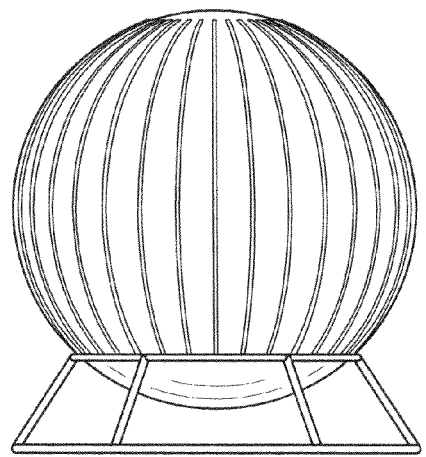
FIG. 15a is a lateral view of an adjustable height mooring pedestal for a spherical body.
Figure 15B:
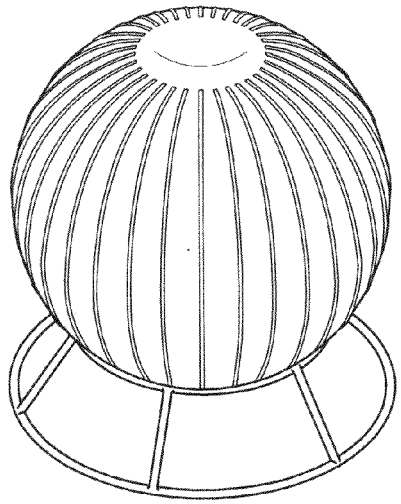
FIG. 15b is an isometric view of and adjustable height mooring pedestal for a spherical body.

Without restricting the generality of the apparatuses that can be used to apply the method of the invention, an example of a support pedestal for the mooring of a spherical body above the wall is shown in FIG. 15. In this example, the pedestal is a structure capable of carrying the restraining loads to be applied to the sphere and providing for the support of the sphere and attachments devices/members/elements (e.g. the cables/ropes represented in FIG. 15 that run along the surface of the sphere to the top ring). An additional set of ropes (not represented) oriented at an angle with respect the meridians of the sphere could for example be used to provide torsional restraint.

Figure 16:
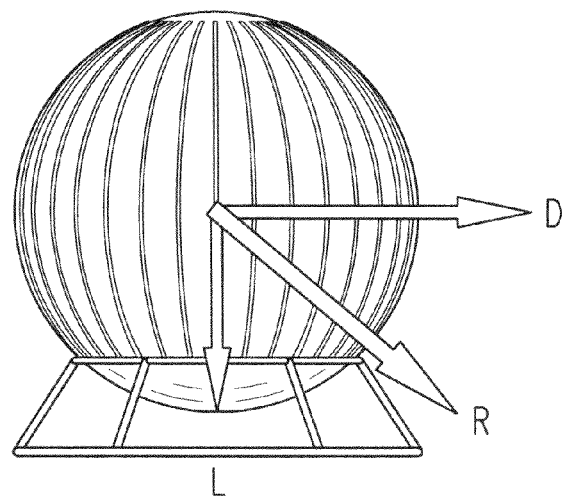
FIG. 16 illustrates airloads for a pedestal moored sphere.

As shown in FIG. 16, one effect of the negative lift is the stabilizing reduction in tip-over tendency of the pedestal due to the effect of drag.

In addition to providing a desirable change in airloads by positioning and holding the sphere at the desired distance from the ground plane, restraining the sphere against airloads as shown in FIG. 16 and discussed in the previous paragraph provides a superior restraining system for the sphere by distributing the airloads over more ropes compared to other conventional rope-based mooring techniques in which only the mostly upwind ropes carry load.

The number of configurations of apparatuses that serve to implement the method of this invention is without limit, and the exemplifying representation of FIG. 16 should not be interpreted as limiting or in any way restricting the configurations claimed by this invention. Any structure that positions the sphere a predetermined distance from a surface such as the ground to obtain the benefits discussed herein is considered to be within the scope of the invention.

The applicability of the apparatus and method of this invention is not limited to spherical shapes and/or to airships. Numerous other examples can be given, including, for example, spherical tanks that are used to store pressurized fluids, tanks of many other shapes, etc. Applying the present invention to such tanks can reduce wind loads and consequently reduce the chances of wind induced damage to the tanks, or at least raise the wind tolerance of the tanks so that they can withstand higher wind loading.

When applied for airship mooring, the apparatus and method of this invention has at least the following advantages:
- Pedestal can be conveniently disassembled, transported, and reassembled as needed
- Minimal weight penalty for the airship—only ropes fly away
- Pedestal can be attached to the ground through fewer, stronger attachment points
- More effective transfer of rope load into the envelope, both at the attachment points and along each rope
- More uniform sharing of load among the ropes in response to wind loading

EXAMPLE

Figure 17:
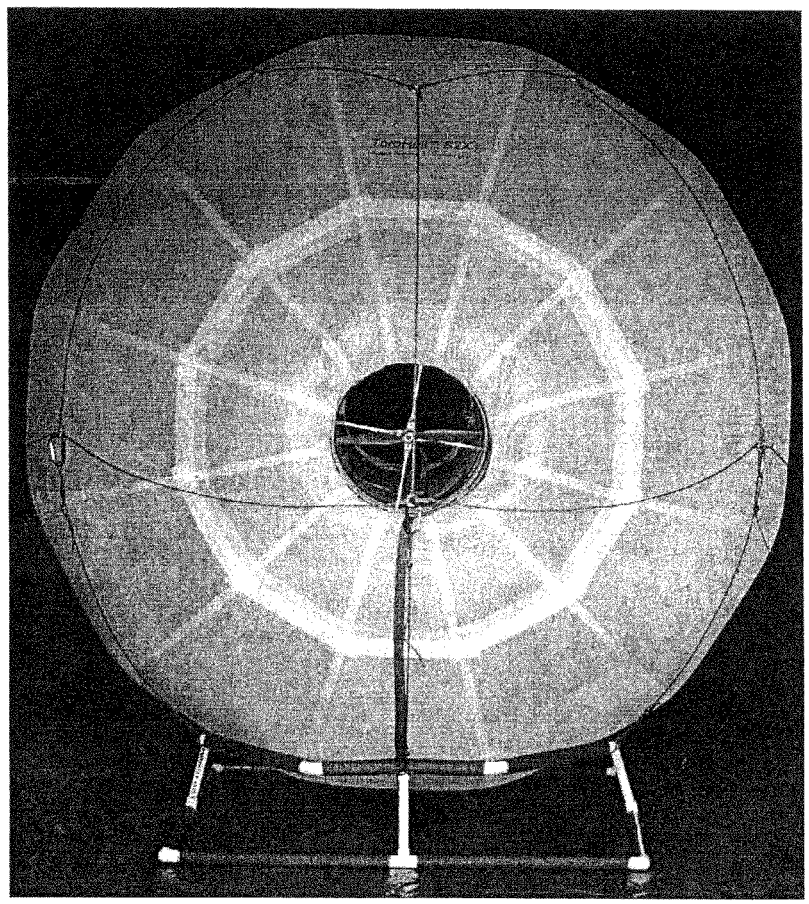
FIG. 17 is a front view of a prototype of a powered ducted spherical airship and pedestal mooring according to principles of this disclosure.
Figure 18:
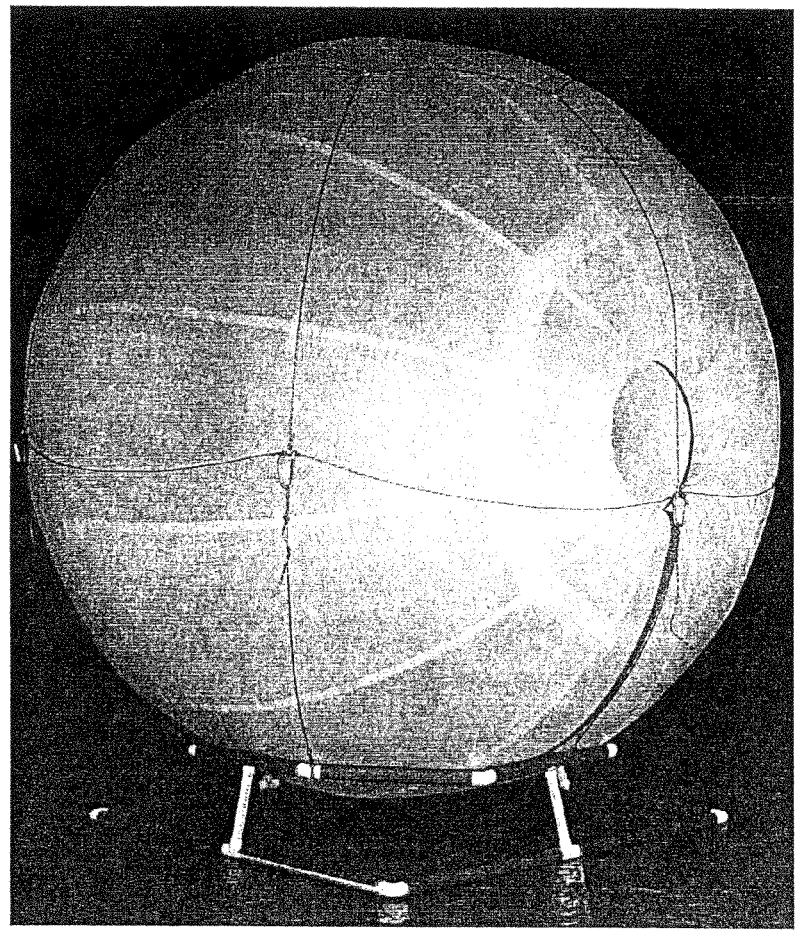
FIG. 18 is a front quadrant view of a prototype of a powered ducted spherical airship and pedestal mooring according to principles of this disclosure.

An implementation of the present invention on a small scale (6.5 ft diameter) remote controlled experimental airship model is shown in FIGS. 17-18. This is a fully electric vehicle, with Li polymer batteries and a brushless electric motor controlled by an electronic speed control unit connected to a remote control receiver driving a propeller within the duct of the airship. The receiver also controls the servomechanisms that actuate control surfaces located at the exit end of the duct. Gyrostabilization units are connected in series with each of the servomechanisms in order to provide flight stability in pitch and yaw. Details of the specific implementation of the duct end control surfaces are shown in FIG. 19. Details of the specific implementation of the duct propulsor, in this case a propeller, are shown in FIG. 20. FIGS. 17 and 18 illustrate the ducted spherical airship of the present invention with a propeller-based propulsor inside the duct and louver-based control surfaces at the exit of the duct. These figures also illustrate an airship mooring platform according to the invention that positions the airship a predetermined distance from the ground to minimize wind loads on the airship and reduce the chances of wind load induced damage.

Additional Aspects of the Invention

A further improvement is realized through the use of a combustion-based propulsion system in the venting duct of the airship by the fact that a mixing of the hot exhaust gasses from the engine with the cold bypass duct flow allows further propulsive force to be produced by accelerating this warm mixed duct flow in a duct exit nozzle, thereby improving the overall propulsive efficiency for the airship. In contrast to prior art (e.g. the toroidal hull concepts of Todd and Tachibana discussed above) the present invention teaches a long duct with the engine and the engine intake/exhaust located in the duct, which enhances the mixing of the exhaust and bypass duct flow. From an energy standpoint, the entire chemical energy released by burning the fuel is transferred to the duct flow, and can thereby be better harnessed to generate propulsive force.

Heat transfer from the duct to the lifting gas in such a configuration increases its temperature, thereby increasing its volume and consequently improving the buoyancy force generated. Control over the rate of heat transfer provides therefore an additional means of buoyancy control.

An airship according to the invention may use $H_2$ as the lifting gas, or a volume of $H_2$ surrounded by a volume of He to insulate the flammable $H_2$ gas from the surrounding atmospheric air. The lifting gas can be stored in a Dewar container in liquefied form, with the boil-off released into the lifting gas bag and used for power generation in a $H_2$ based fuel cell. The solution is particularly effective for high altitude airships—the low atmospheric temperature at high altitudes reduces the $H_2$ boil-off rate. Conventional propulsion systems that use hydrocarbon based fuels (e.g. gasoline or jet fuel) need to maintain the temperature of the fuel above that at which the fuel start to gel in order to allow proper fuel flow. In contrast, a $H_2$ based fuel system is not detrimentally impacted by the low atmospheric temperatures at high altitudes. Additional benefits flow from the fact that $H_2$ is less expensive than He; the same agent is used for both propulsion and buoyancy.

He is typically handled in compressed gas form, due to its extremely low liquefaction temperature. Consequently, the weight of high pressure He containers is very high. When using He as a lifting gas, typically the lifting gas is released into the envelope at the stage of ground inflation and no additional compressed lifting gas is carried on board. Therefore, during flight it is only possible to reduce buoyancy by releasing He gas into the atmosphere, but it is not possible to increase buoyancy. When lift increases are desired ballast needs to be released overboard or heat needs to be provided to the lifting gas.

In contrast, the use of liquid $H_2$ makes it possible conveniently also increase the volume of lifting gas during flight by $H_2$ boil-off, for example by the provision of heat electrically generated through Joule effect.

The present invention further includes a high altitude airship that is released and climbs either as a free floating balloon or under power, and which at a desirable time and location drops one or more anchoring lines that terminate with a free-falling and/or powered guided (GPS, inertial, remote controlled, etc.) anchor that has means to securely attach itself and the line to the ground upon impact in order to react line forces. The means of attachment can be inertial, electromechanical, or pyrotechnically driven. Each anchor can be independently guided to impact the ground at a selected location. Upon securely mooring itself to the ground with at least one line, the airship subsequently uses its propellers in windmill mode in order to harvest wind energy for use by its onboard systems (communications, payload functions, etc.) thereby effectively becoming an atmospheric energy harvesting moored aerostat. The lines preferably can be manufactured from high performance fibers (Dyneema, Spectra, PBO, Vectran, Kevlar, etc.), capitalizing upon their extraordinarily high specific strength and stiffness. In order to increase the dynamic (shock) loading capability of the lines, they can be manufactured based upon the patented energy absorbing tailoring concept of Dancila and Armanios. The thickness of the line can be varied to take optimal advantage of the change in line force due to its own weight. As a consequence, the distal end of the line, near the anchor, should be of lower cross section compared to the end near the payout reel (i.e. at the airship end) resulting in weight savings and in rendering the distal end more difficult to detect visually. The airship can additionally use solar cells to harvest solar energy. Excess harvested electrical energy is stored in batteries (e.g. Li polymer) or through a reversible $H_2$ fuel cell as reactants. The use of three anchoring lines allows full control and determination of the 3D station keeping position of the airship. Controlled reeling of the individual mooring line(s) allows controlled changes in the station keeping position. This in turn allows the airship to accommodate necessary changes in payload location as well as a better exploitation of atmospheric conditions (e.g. wind intensity and direction) at various altitudes for energy harvesting.

The present invention also includes a method of drag reduction for airships and balloons that capitalizes upon the fact that the envelope of an inflated airship or balloon is a membrane under tensile loading, similar to a drumhead, and is naturally capable of vibrating with large amplitudes both in plane and out of plane. Therefore with relatively low levels of energy expenditure the envelope of an airship or balloon can be excited to vibrate with significant amplitude that is sufficient to excite mixing in the boundary layer air flow, forcing momentum exchange between the fluid that is near the envelope wall and has lost some of its momentum and energy through wall friction and fluid that is further away from the wall and is still retaining more of its momentum and energy. As a consequence of this mixing, the boundary layer velocity profile is modified and such that it is less prone to separation, resulting in a smaller separated wake region and lower overall drag. The patterns of envelope wall vibration (distribution of vibration amplitude, vibration frequency content, and vibration phasing) can be suitably selected as a function of the flight conditions, reflected by the Mach and Reynolds numbers, and body vortex shedding frequency, as reflected in the Strouhal number, in order reach the desired goal, e.g. maximum drag reduction. However, other goals can be similarly defined, e.g. the establishment of airflow patterns that result in desirable aerodynamic forces and moments that can be used for flight control.

The mixing in the boundary layer can be enhanced by the placement of cilia-type elements on the external surface of the envelope and which can be tuned in their dynamic characteristics such as to respond with a desired vibration amplitude and phasing to specific excitation of the envelope membrane, thereby further protruding into the boundary layer and enhancing mixing.

The envelope vibration patterns may consist of standing waves, traveling waves, or their combinations, as well as of transient patterns suitably chosen for maximizing specific objective functions.

The excitation of the envelope membrane can be performed both non-contact, via acoustic waves traveling from conveniently placed speaker-type sources, or through envelope embedded or attached actuators that are suitably located. Among the preferred actuators are induced strain actuators (e.g. piezoelectric materials) which change their dimensions when excited with and electric field, as well as electrodynamic ones (e.g. shakers, speaker coil type, motor with an eccentric rotor, etc.).

The invention has been described herein in terms of preferred embodiments and methodologies considered by the inventor to represent the best mode of carrying out the invention. It will be clear to skilled artisans, however, the various additions, deletions, and modifications to the disclosed embodiments might well be made within the scope of the invention. Thus, the invention is not limited by the specific embodiments described above, but instead is circumscribed by the claims hereof.

What is claimed is:

1. An airship comprising:
    a bluff airship hull;
    a venting duct extending through said bluff airship hull from a bell-mouth fairing forming an intake opening to an exit opening having a diameter less than said bell-mouth fairing;
    a propulsor mounted along said venting duct and disposed therein to direct a flow of air through said venting duct for expulsion from said exit opening to provide thrust, said expulsed air from said exit opening disrupting a wake of said airship hull and thereby reducing drag;
    a series of duct branches extending from said venting duct toward outlets located in the sides of said bluff airship hull, wherein a portion of said flow of air can be diverted into said duct branches; and
    control means for vectoring said expulsed air at said exit opening and for vectoring said diverted air at said outlets of said duct branches as needed to generate control moments for the operation of said airship.

2. The airship of claim 1 and wherein said hull is substantially spherical.

3. The airship of claim 1 and wherein said control means comprises articulatable louvers disposed at said exit opening of said venting duct and actuated elbow nozzles disposed at said outlets of said duct branches.

4. The airship of claim 1 and wherein said control means comprises at least one vectorable nozzle or control surface mounted adjacent said exit end for deflecting air vectoring said expulsed air from said exit end for generating yaw and/or pitch control moments and forces.

5. The airship of claim 1 and further comprising at least one valve mechanism for diverting said the air flow within said venting duct into said duct branches.

6. The airship of claim 1 and wherein said control means further comprises at least one gyro for reducing instabilities of said airship.

7. An airship comprising:
    a bluff airship hull;
    a venting duct extending through said bluff airship hull from a bell-mouth fairing forming an intake opening to an exit opening having a diameter less than said bell-mouth fairing, wherein a flow of air is drawn through said venting duct and is directed out of said exit opening;
    a combustion-based propulsion system including an engine intake/exhaust and being mounted within said venting duct for directing said flow of air through said venting duct and out of said exit opening, said flow of air being mixed with hot exhaust gases from said engine intake/exhaust of said propulsion system and accelerated through said venting duct for producing an expulsed air flow having increased propulsive force; and
    a control system including at least one vectorable nozzle, vectoring control surface or deflecting louver adjacent said exit opening of said venting duct for vectoring said expulsed air flow from said exit opening to provide control forces and moments for operation of said airship.

8. The airship of claim 7, wherein said propulsion system further comprises an engine and a rotating propeller driven by said engine.

9. The airship of claim 8, wherein said propeller comprises a ducted propeller.

10. The airship of claim 7, and further comprising a series of duct branches extending from said venting duct toward outlets located in the sides of said hull, wherein a portion of said flow of air can be diverted into said duct branches to generate control forces and moments for operation of said airship.

11. An airship comprising:
a bluff airship hull;
a venting duct extending through said bluff airship hull from a bell-mouth fairing forming an intake opening to an exit opening having a diameter less than said bell-mouth fairing;
a propulsor mounted along said venting duct and disposed therein to direct a flow of air through said venting duct for expulsion from said exit opening to provide thrust, said expulsed air from said exit opening disrupting a wake of said airship hull and thereby reducing drag; and
control means for vectoring said expulsed air from said exit opening as needed to generate control moments for the operation of said airship wherein the airship further comprises a series of duct branches extending from said venting duct toward outlets located in the sides of said bluff airship hull, and wherein a portion of said flow air can be diverted into said duct branches as needed to generate additional control moments for the operation of said airship.

12. The airship of claim 11, wherein said propulsor comprises a ducted propeller.

13. The airship of claim 12, wherein said ducted propeller is positioned proximate said bell-mouth fairing.

14. The airship of claim 11, wherein said control means comprises articulatable louvers disposed at said exit opening of said venting duct.

15. The airship of claim 11, further comprising actuated elbow nozzles disposed at said outlets of said duct branches for vectoring said diverted air from said outlets of said duct branches as needed to generate said additional control moments.

16. The airship of claim 11, wherein a diameter of said vented duct is substantially constant from said intake opening downstream of said bell-mouth fairing to said exit opening.

* * * * *